United States Patent
Burkhardt et al.

[11] 3,921,530
[45] Nov. 25, 1975

[54] ELECTRICAL TRIP WIRE SWITCH

[75] Inventors: Lawrence E. Burkhardt, Burtonsville; Basil H. Manns, Silver Spring, both of Md.

[73] Assignee: The United States of America as represented by the Secretary of the Navy, Washington, D.C.

[22] Filed: Dec. 7, 1973

[21] Appl. No.: 422,620

Related U.S. Application Data

[63] Continuation of Ser. No. 140,392, May 5, 1971, abandoned.

[52] U.S. Cl. ............ 102/70.2 R; 102/8; 307/252 F; 340/248 D; 340/274
[51] Int. Cl. . F42c 11/00; H03k 17/60; G08b 13/08
[58] Field of Search......... 102/70.2 R, 8; 200/61.93; 307/252 F, 252 J; 340/248 A, 248 B, 248 C, 248 D, 274

[56] References Cited
UNITED STATES PATENTS

| | | | |
|---|---|---|---|
| 2,961,962 | 11/1960 | Jackson | 102/8 |
| 3,531,792 | 9/1970 | Bagno et al. | 307/252 J |
| 3,644,918 | 2/1972 | Perlman | 307/252 F |

OTHER PUBLICATIONS

G.E. Transistor Manual, "Unijunction Transistor Circuits," pp. 312–316, General Electric Company, 1964.

*Primary Examiner*—Samuel W. Engle
*Assistant Examiner*—C. T. Jordan
*Attorney, Agent, or Firm*—R. S. Sciascia; J. A. Cooke

[57] ABSTRACT

A switch circuit, for activating a Munition and indicating intrusion into an area past a trip wire, operated by the proximity of a magnet to an inductor having a high permeability core. A relaxation oscillator producing high energy pulses induces a time-varying current in the coil hence creating a varying magnetic field in the core. A permanent magnet in proximity to the core causes saturation and decreases the impedance of the inductor. When the permanent magnet is removed, as by being pulled away by a trip wire, the impedance increases greatly to permit a high potential to appear across the coil. The "on-off" characteristics of a switch is thus simulated.

11 Claims, 1 Drawing Figure

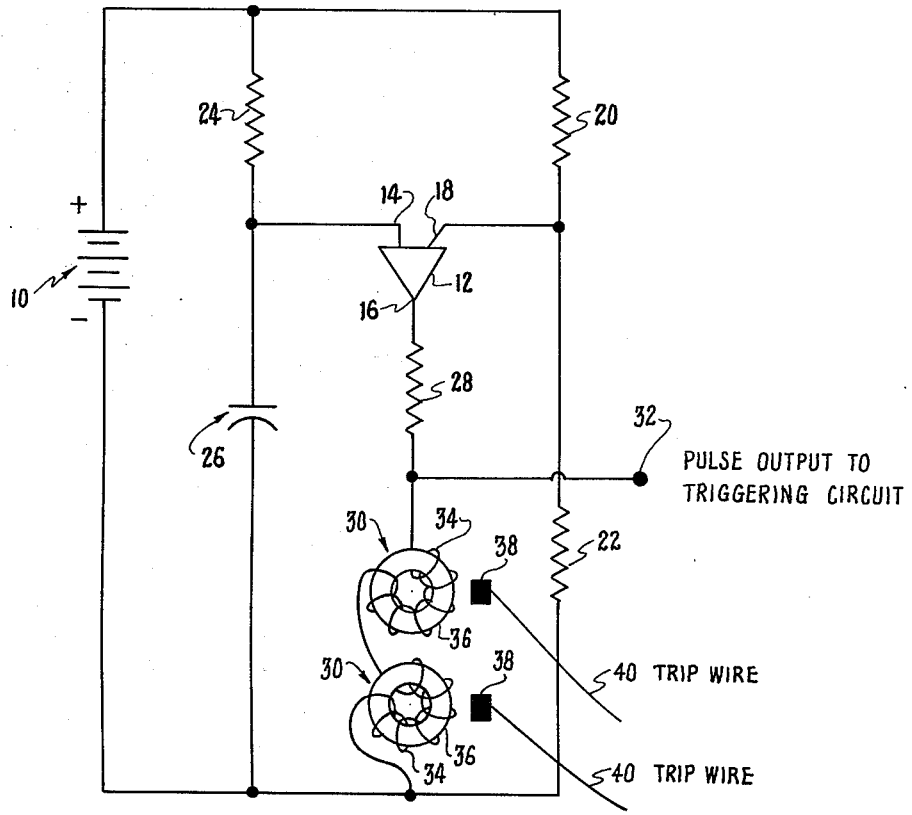

ELECTRICAL TRIP WIRE SWITCH

CROSS REFERENCE TO RELATED APPLICATIONS

This application is a continuation of application Ser. No. 140,392 filed May 5, 1971, now abandoned.

BACKGROUND OF THE INVENTION

This invention relates generally to electronic switches and more particularly, to a switch circuit having a relaxation oscillator and a saturable inductor. Electrical switches have been used in the past to activate munitions or to indicate intrusions past a trip wire, however, they have been generally the mechanical contact-type switch. The switches, however, are subject to and vulnerable to environmental conditions such as vibration and dust, dirt, and moisture which may cause untimely activation or no activation at all after being in situs for considerable periods of time. Electronic switches have also been used for alarm systems; however, their electronic circuits are generally quite complex and expensive and therefore not suitable for fabrication into munition where they are used in great quantities and considered expendable.

Although some types of electronic switches have been simplified in design and consequently less expensive to fabricate, they have relied on low frequency methods requiring a considerable number of windings, i.e., 1000, on the magnetic core to achieve saturation and thereby requiring considerable input power. For portable use, a device is needed which can rely on battery power for extended periods of time, i.e., weeks or even months, which is impossible using the prior art methods.

SUMMARY OF THE INVENTION

Accordingly, an object of the present invention is to provide a compact, reliable and inexpensive electrical trip wire switch.

Another object of the instant invention is to provide a electrical trip wire switch having no mechanical contact points.

Another object of the instant invention is to provide an electrical switch is shock resistant, reliable in operation over extended periods of time, and is resistant to adverse environmental conditions.

Another object of the present invention is to provide an electrical trip wire switch can operate on battery power for extended periods of time in remote locations.

Briefly, these and other objects of the present invention are attained by the use of a relaxation oscillator, the frequency of which is controlled by the time constant of an RC network. The high energy pulses produced by the relaxation oscillator are applied to an inductor having a high permeability core. The proximity of a permanent magnet to the inductor greatly decreases the impedance of the inductor, and the removal of the permanent magnet causes the impedance of the inductor to increase greatly. Thus, the high energy pulses from the relaxation oscillator are either shunted to ground permitting no output from the circuit, or the inductor acts as an open circuit to permit output pulses to activate a munition, or the like.

BRIEF DESCRIPTION OF THE DRAWING

A more complete understanding the invention and many of the attendant advantages thereof will be readily appreciated as the same becomes better understood by reference to the following detailed description when considered in connection with the accompanying drawing wherein the sole FIGURE is a circuit schematic of the electrical trip wire switch according to the present invention.

DESCRIPTION OF THE PREFERRED EMBODIMENT

Referring now to the DRAWING, the electrical trip wire switch including a saturable reactor and a relaxation oscillator is shown having a source of D.C. voltage such as a battery 10. A programmable unijunction transistor (PUT) 12 having an anode 14, a cathode 16, and a control gate 18, as the active element of the circuit, is connected in the circuit as follows. Control gate 18 of the PUT 12 is connected intermediate a pair of series connected resistors 20 and 22. These resistors 20 and 22 are connected at their respective remote ends to the positive and negative terminals of battery 10, respectively, thus forming a voltage divider to supply the control gate 18 with a fixed voltage.

Also connected to the positive terminal of battery 10 is a resistor 24, and connected to the negative terminal of battery 10 is a capacitor 26. Resistor 24 and capacitor 26 are series connected to form an RC network, and at their common junction is connected to the anode 14 of the PUT 12. The cathode 16 of the PUT 12 is connected to a resistor 28 which is serially connected to one end of either a single inductor 30, the other end of which is connected to the negative side of a battery 10, or to a plurality of serially connected inductors 30. Intermediate the resistor 28 and the inductor 30 is a connection to an output terminal 32.

More particularly, inductor 30 comprises a coil 34 helically wound several times (i.e., preferably less than 100 times and typically less than 10 times) on a core 36 which is made of a high permeability material such as, for example, a ferrite material. Shown adjacent the inductor 30 is a permanent magnet 38 which is held in close proximity by the magnetic force developed between the permanent magnet 38 and the ferrite core 36. Mechanically attached to the permanent magnet is a trip wire 40.

In operation, battery 10 supplies a D.C. potential across the series connected resistors 20 and 22, each of which is in the megohm range, and which form a voltage-divider network to place a fixed bias voltage of approximately 5 volts upon the control gate 18 of the PUT 12. The time constant of the series R-C network may be selectively varied, as is well known in the art, by varying the capacitance of capacitor 26. The anode 14 of PUT 12, connected intermediate this resistor and capacitor, receives a varying voltage during the charging and discharging cycle of the capacitor 26. As is now evident, the capacitor 26 will begin to charge from a zero potential through resistor 24 towards a potential close to that of the battery 10. When the voltage across capacitor, and thus the voltage applied to the anode 14 of the PUT 12, approaches a voltage of 0.5 greater than the control gate 18, that is approximately 5.5 volts, the PUT 12 fires or conducts between the anode 14 and the cathode 16. The positive voltage appearing at the cathode 16 is conducted through the low resistance of resistor 28 and the inductors 30 directly to the battery negative and the return side of the capacitor 26. Thus, the capacitor 26 is shunted and the charge across its plates goes essentially to zero and thus the voltage anode 14 of the PUT 12 is drawn down below the voltage of the bias voltage on the control gate 18, and the PUT 12 becomes nonconducting again. The capacitor 26 is then open circuited and will now readily accept a charge through the resistor 24 repeating the cycle discussed above. Therefore, as can readily appreciated from the foregoing, the circuit operates as a fast, current pulse relaxation oscillator at a frequency controlled by the RC network composed of resistors 24 and capacitor 26.

Resistor 28 and the inductors 30, connected in series between the cathode 16 of the PUT 12 and the return or negative side of the battery 10, form a voltage divider network. A pulse output may be obtained at the intermediate connection of the resistor 28 and inductors 30 under varying conditions discussed below. This voltage divider can vary the voltage of the pulse output at terminal 32 when the reactance of the inductors 30 is changed. Because of the high permeability of the ferrite core 36, a permanent magnet 38 in close proximity to the core will saturate the inductors 30 so their impedance will be very small and close to the D.C. resistance of coil 34. Thus the voltage of the pulses at output terminal 32 will be very low and only a few millivolts above the negative or return side of the battery 10. When any one of the permanent magnets 38 is pulled away from its corresponding inductor 30, as due to a slight pull on the trip wire 40, the inductors 30 will then have a relatively high impedance (unsaturated) close to or above that of the resistor 28. The voltage between the cathode 16 of the PUT 12 and the return side of the battery will be approximately equally divided, thus applying a pulse voltage of about 2 volts to output terminal 32.

The advantage of a relaxation oscillator is that a fast, high energy current pulse is available. If this fast, high energy current pulse is used to saturate the core, the core size and number of turns in the inductors 30 can be greatly reduced. Saturation resulting in the core is due to the fast current pulse itself, not the frequency of operation of the oscillator thus no turned circuits are needed, either for detection or signal generation. Since the relaxation oscillator applies a fast, high energy current pulse through the core, which is an integral part of the oscillator, the instantaneous power applied to the core windings is extremely high, while overall power dissipated of the system is extremely low. The net effect is low power operation, small core size, and fewer windings in inductors 30.

Obviously, numerous modifications and variations of the present invention are possible in light of the above teachings. It is therefore to be understood that within the scope of the appended claims the invention may be practiced otherwise than as specifically described.

What is new and desired to be secured by Letters Patent of the United States is:

1. A compact, easily camouflaged, magnetically triggered electrical trip wire switch for use in remote locations for extended periods comprising:
   means for producing a fast, high energy, low average power, electrical pulse waveform produced by a voltage sensitive uni-directional conducting device which repetitiously discharges a capacitance upon reaching a predetermined voltage level;
   variable induction means comprising a small predetermined number of windings about a miniturized magnetic saturable material for decreasing the magnitude of said electrical pulse waveform below a predetermined output level whenever said magnetic saturable material is saturated;
   triggering means for saturating said magnetic saturable material when located proximate thereto; and,
   output means for conducting said electrical pulse waveform to indicate said magnitude of said electrical pulse waveform.

2. The device of claim 1 wherein said triggering means comprises a permanent magnet connected to a trip wire.

3. The device of claim 1 wherein said means for producing an electrical pulse waveform comprises a relaxation oscillator.

4. The device of claim 1 wherein said voltage sensitive uni-directional conducting device comprises a programmable unijunction transistor.

5. The device of claim 2 wherein said means for producing an electrical pulse waveform comprises a relaxation oscillator.

6. The device of claim 2 wherein said voltage sensitive unidirectional conducting device comprises a programmable unijunction transistor.

7. The device of claim 5 wherein said voltage sensitive uni-directional conducting device comprises a programmable unijunction transistor.

8. The electrical circuit of claim 1 wherein said predetermined number of windings is less than 10.

9. The electrical circuit of claim 7 wherein said predetermined number of windings is less than 10.

10. The electrical circuit of claim 1 wherein said predetermined number of windings is less than 100.

11. An electrical trip wire switch for use in remote locations comprising:
    a portable power source having a positive output and a negative output;
    a series resistance - capacitance circuit connected to form a first path across said portable power from said positive output to said negative output;
    dual resistance means connected to form a second path across said portable power source from said positive output to said negative output;
    a programmable unijunction transistor having a cathode, an anode connected to said first path, and a gate connected to said second path
    an additional resistor connected to said cathode of said programmable unijunction transistor;
    inductive means connected to said additional resistor and said negative output of said portable power source to form an impedance to pulses produced by said programmable unijunction transistor
    magnetic means connected to a trip wire and located proximate said inductive means for causing a substantial increase in said impedance of said inductive means upon removal from said proximate location of said magnetic means, said removal resulting from forces on said tripwire; and,
    output means connected between said additional resistor and said inductive means for conducting pulses produced on said output means as a result of said substantial increase of said impedance of said inductive means.

* * * * *